United States Patent [19]

Sharpe et al.

[11] Patent Number: 5,510,911

[45] Date of Patent: Apr. 23, 1996

[54] HOLOGRAPHIC IMAGE CONTAINING FOIL-TEXTILE LAMINATE AND PROCESS FOR THE PRODUCTION THEREOF

[75] Inventors: Richard A. Sharpe; Mia J. Manners, both of London, Great Britain

[73] Assignee: Own Label Products Limited, England

[21] Appl. No.: 916,843

[22] Filed: Apr. 8, 1993

[30] Foreign Application Priority Data

Feb. 13, 1990 [GB] United Kingdom ............... 9003272

[51] Int. Cl.$^6$ ............................. G03H 1/00; B32B 31/00
[52] U.S. Cl. .......................... 359/1; 156/309.6; 156/324; 264/1.34; 430/1; 430/2
[58] Field of Search ............................. 156/309.6, 230, 156/240, 324; 430/1, 2; 359/1, 12, 13; 264/1.34

[56] References Cited

U.S. PATENT DOCUMENTS

| | | | |
|---|---|---|---|
| 3,944,454 | 3/1976 | Burgheimer | 156/309.6 X |
| 4,645,555 | 2/1987 | Kuboyama | |
| 4,657,803 | 4/1987 | Pernicano | 156/230 X |
| 4,728,377 | 3/1988 | Gallagher | 156/240 X |
| 4,838,965 | 6/1989 | Bussard | |
| 4,956,040 | 9/1990 | Fry | 156/267 |
| 4,971,646 | 11/1990 | Schell et al. | 156/277 X |

FOREIGN PATENT DOCUMENTS

| | | |
|---|---|---|
| 0242457 | 10/1987 | European Pat. Off. . |
| 0291160 | 11/1988 | European Pat. Off. . |
| 0294936 | 12/1988 | European Pat. Off. . |
| 0328086 | 8/1989 | European Pat. Off. . |
| 8533471 | 1/1986 | Germany . |
| 8533912 | 5/1986 | Germany . |
| 2205533 | 12/1988 | United Kingdom . |

OTHER PUBLICATIONS

"Fashion of the Future", Screen and Display, Dec. 1991, pp. 16–17.

Primary Examiner—Jeff H. Aftergut
Attorney, Agent, or Firm—Zarley, McKee, Thomte, Voorhees & Sease

[57] ABSTRACT

A process for the production of a flexible laminate having an outer and visible layer which provides a holographic effect. A metal foil bearing a holographic image and a layer of plastics size is brought together with a flexible substrate having an outer layer of a plastics material which is comparable with said size. The substrate and foil are brought together with their plastics layers adjacent each other, under conditions of heat and pressure at a level and for a time sufficient to adhere the foil to the substrate but insufficient to destroy the holographic effect.

14 Claims, No Drawings

HOLOGRAPHIC IMAGE CONTAINING FOIL-TEXTILE LAMINATE AND PROCESS FOR THE PRODUCTION THEREOF

This invention relates to a foil laminate and a process for the production thereof. In particular, the invention relates to a laminate in which an outer layer provides a holographic effect.

It is known, for example, from British Patent Specification No. 2 205 533 A to provide a decorative holographic material having an activatable adhesive surface. The earlier decorative material may be applied to fabric either as such or when the fabric is in the form of an article of clothing to provide a holographic transfer. The earlier invention provides for a water impermeable material between the holographic and adhesive elements so that the transfer is washable. Nevertheless, the transfer is such that it stiffens the area where it is applied and provides a rigid item even where the fabric to which it is applied is flexible.

We have now found surprisingly that a flexible laminate in which an outer and visible layer provides a holographic effect can be produced by laminating together a plastics-coated flexible substrate such as a plastics-coated fabric and a metal foil bearing a holographic pattern and a plastics size by bringing together the substrate and foil with their plastics layers in contact and applying heat and pressure.

Accordingly, the present invention in one aspect provides a process for the production of a flexible laminate in which an outer and visible layer provides a holographic effect, which process comprises bringing together a metal foil bearing a holographic image, and having a layer of plastics size, and a flexible substrate in which at least an outer layer comprises a plastics material which is compatible with said size sufficient to enable the plastics material and size to adhere together under conditions of temperature and pressure which do not destroy the holographic effect, the substrate and foil being brought together with their plastics layers adjacent each other, and applying to the combination heat and pressure at a level and for a time sufficient to adhere the foil to the substrate but insufficient to destroy the holographic effect.

In the process of the invention, the metal foil bearing a holographic image may be any flexible metal foil, but preferably is an aluminium foil. Such foils are commercially available as hot stamping foils bearing a holographic pattern which are produced to provide a foil to be applied to a rigid substrate, typically a rigid plastics material. The rigid substrate provides a support for the foil so that the holographic effect may be stabilized. Typically the size of a commercial foil is a pvc (polyvinyl chloride), which is preferred for the foils used in the invention, but other plastics size layers may be employed in the present invention provided they can be adhered to a compatible plastics material as described above.

Also, the foil used in the process of the invention preferably includes a release layer on that surface of the metal foil which does not carry the layer of plastics size. That release layer can serve to provide additional protection for the holographic pattern and is removed after treatment in the process of the invention and before the holographic effect is required. A typical release layer may comprise a polymeric material such as Cellophane (registered Trade Mark).

In the process of the invention the flexible substrate may be any such substrate provided only that it is flexible and comprises said compatible plastics material. Preferably, however, the substrate is a woven or non-woven web, typically a fabric.

More preferably, the substrate is one which is not only flexible but also stretchable. Typically, the fabric may be a commercially-available Lycra fabric or any other similar fabric based on a viscose polymer.

Furthermore, the plastics material may be any such material provided it is compatible as defined above. Preferably, however, the plastics material is a polyurethane and the flexible substrate typically may comprise 70% viscose and 30% polyurethane by content.

Generally speaking, the flexible substrate is one which has an uncoated surface on its reverse side to that carrying the said plastics material. Thus, typically the substrate is a fabric having an uncoated inner surface.

In carrying out the process of the invention, the foil and substrate are fed to a laminating station at which heat and pressure can be brought to bear on their combination. The feeding to the laminating station may be on a continuous or batch basis depending on the requirements of the process being effected. Thus, typically the foil and substrate may be supplied continuously or intermittently from rollers on which they may be stored.

The laminating station may comprise any form of apparatus or device which can supply heat and pressure under the above general requirements. Furthermore, the construction and arrangement of the station may be varied to suit continuous or batch operation. Thus, in one preferred aspect of the invention the laminating station may comprise at least two rollers between which the foil and substrate may be fed to be pressed together and heated. Alternatively, in another preferred aspect the foil and substrate may be brought together in a heated press which typically may comprise upper and lower heated plates which can be brought together under pressure.

Generally, the process of the invention is effected at a temperature below about 170° C. because at that temperature and above commercially-available foil materials tend to lose their holographic colours. Preferably also, the temperature at which treatment is effected is at least above about 140° C. e.g. above about 143° C., with a preferred range being about 150° C. to about 160° C., since below 140° C. wrinkling tends to occur, especially when using stretchable fabric as substrate. However, most preferably the temperature is about 150° C. since a colour shift to pastel colours may take place as temperatures in excess of 150° C. are employed. Accordingly, unless a particular pastel effect is required the temperature is kept to the lower end of the preferred range to maximise the brightness of the holographic colours.

As to pressure, it is preferred to use as high a pressure as is possible within the limits of the press or other apparatus employed. Typically, a pressure of at or above about 200 gm/cm$^2$ may be used, for example, a pressure of about 200 to about 210 gm/cm$^2$ such as a pressure of about 208 gm/cm$^2$ which may be applied in a 1000 kg press with a plate area of 0.4 m×1.2 m.

Generally speaking, in the process of the invention, the heat and pressure are applied for a sufficient time to enable laminate formation to take place. Thus, a variety of dwell times may be employed, although a dwell time of about 30 seconds is preferred, especially under the conditions mentioned above.

In the process of the invention the foil may be used to provide a holographic pattern or other holographic effect. Thus, for example, as an alternative to an overall pattern, the foil may embody a variety of holographic images, either single images or a plurality thereof. Typically, the or each image may be a holographic photo-release image, for example, of a pop-star or the like.

In another aspect, the invention also provides a flexible laminate in which an outer and visible layer provides a holographic effect, which laminate comprises a layer of metal foil bearing a holographic image, a layer of a flexible substrate and an adhesive layer between the substrate and the foil which comprises at least one plastics material or a mixture of at least two compatible plastics materials.

The flexible laminate as defined above generally may be produced by the process of the invention. Also, the flexible laminate may typically have one or more of the features defined herein in connection with that process.

Generally speaking, the flexible laminate of the invention or produced by the process of the invention has a variety of uses all of which may require a flexible material to display a holographic effect. Thus, for example, the flexible laminate may be used in the theatre for background, props or clothing, for other clothing such as skinwear or protective clothing e.g. for cyclists, for marine equipment such as sails for windsurfing boards, or toys.

The fabric of the invention is a fully flexible laminate which generally has the same or a similar high degree of flexure as the flexible substrate from which it is made. Thus, the laminate should always be capable of a high degree of flexure and a treated fabric, for example, should be capable of behaving as a fabric so that clothing can be made therefrom essentially as easily as from the original fabric.

The invention will now be described by way of example only with reference to the following specific Example.

EXAMPLE

A 150 gsm Lycra fabric comprising 70% viscose and 30% polyurethane by content and which was clean and free from dust and grease was fed to the top surface of the lower plate of a Hashima HP124AP 1000 kg fully automatic flat fusing press having a fusing plate area of 0.40 m×1.2 m preheated to 150° C. There was then fed over the Lycra fabric an aluminium holographic hot stamping foil with a pvc sizing (supplied by Applied Holographics as E39 with pvc 68 sizing), the pvc sizing facing downwards onto the fabric. The pressure of the fusing press was then set to 1000 kg and the upper plate of the press brought down on the combination disposed over the lower plate. The upper and lower plates were held together for 30 seconds at 150° C. and then the pressure was released and the fused laminate removed.

The laminate was allowed to cool and the release layer of the original foil was removed. The result was a flexible laminate exhibiting a very pleasing holographic effect and behaving essentially as the original fabric. The holographic effect was as bright as that of the original foil, the foil appeared to be bonded down into the fabric, and the holographic effect was permanent and fast. Thus, it was impossible to wash or scrape off the holographic layer even when the fabric was stretched, although stretching to a high degree would begin to destroy the fabric itself.

It is of course to be understood that the invention is not limited to the specific details given above and numerous variations may be made within the spirit and scope of the claims which follow.

We claim:

1. A process for producing a flexible laminate in which an outer and visible layer provides a holographic effect, which process comprises providing a first roller on which is stored an aluminum foil bearing a holographic image, and having a layer of plastics size, providing a second roller on which is stored a flexible woven or unwoven fabric substrate having a degree of flexure such that clothing can be made therefrom in which at least an outer layer comprises a plastics material which is compatible with said size sufficient to enable the plastics material and size to adhere together under conditions of temperature and pressure which do not destroy the holographic effect, and supplying said foil and said substrate from said rollers to a laminating station comprising at least two press rollers between which said foil and substrate are pressed together with their plastics layers adjacent each other to form a combination, said press rollers applying to the combination heat and pressure at a level and for a time sufficient to adhere the foil to the substrate but insufficient to destroy the holographic effect, the laminate, subsequent to lamination, having generally the same degree of flexure as the fabric substrate such that clothing can be made therefrom.

2. A process according to claim 1 wherein the foil is a hot stamping foil bearing a holographic pattern.

3. A process according to claim 1 wherein the size of the foil is a polyvinyl chloride.

4. A process according to claim 1 wherein the foil includes a release layer on that surface of the metal foil which does not carry the layer of plastics size.

5. A process according to claim 4, wherein the release layer is removed after treatment and before the holographic effect is required.

6. A process according to claim 1 wherein the substrate is one which is not only flexible but also stretchable.

7. A process according to claim 1, wherein the fabric is a fabric based on a viscose polymer.

8. A process according to claim 1 wherein the compatible plastics material is a polyurethane.

9. A process according to claim 8, wherein the flexible substrate comprises 70% viscose and 30% polyurethane by content.

10. A process according to claim 1 wherein the temperature conditions are below about 170° C. and above about 140° C.

11. A process according to claim 1 wherein the pressure is at least about 200 gm/cm$^2$.

12. A process according to claim 1 wherein the dwell time during which the temperature and pressure conditions apply is about 30 seconds.

13. A flexible laminate made by the process of claim 1.

14. The process of claim 1 comprising the further step of making the laminate into clothing.

* * * * *